United States Patent [19]
Hansen et al.

[11] Patent Number: 4,598,118
[45] Date of Patent: * Jul. 1, 1986

[54] COATINGS CONTAINING AN ALPHAOLEFIN TERPOLYMER

[75] Inventors: Frederick C. Hansen, Union Grove; Richard A. Kiehlbauch, Racine, both of Wis.

[73] Assignee: S. C. Johnson & Son, Inc., Racine, Wis.

[*] Notice: The portion of the term of this patent subsequent to Jun. 11, 2002 has been disclaimed.

[21] Appl. No.: 508,698

[22] Filed: Jun. 28, 1983

[51] Int. Cl.$^4$ ............................................. C08L 37/00
[52] U.S. Cl. .................................. 524/517; 524/487; 524/549; 525/207; 526/272
[58] Field of Search ................. 524/487, 517; 526/272

[56] References Cited

U.S. PATENT DOCUMENTS

| | | |
|---|---|---|
| 3,723,375 | 3/1973 | Field et al. ............................ 524/549 |
| 3,819,557 | 6/1974 | Loeffler et al. ............. 260/29.6 TA |
| 3,879,494 | 4/1975 | Milkovich et al. ............. 260/876 R |
| 3,950,290 | 4/1976 | Drury, Jr. et al. .................... 427/258 |
| 3,951,892 | 4/1976 | Drury, Jr. et al. .................... 427/258 |
| 4,011,283 | 3/1977 | Sturt ................................ 260/880 R |
| 4,062,823 | 12/1977 | Cheung et al. ...................... 524/389 |
| 4,208,490 | 6/1980 | Kondo et al. ...................... 525/243 |
| 4,242,243 | 12/1980 | Antonelli et al. .................... 525/242 |
| 4,358,573 | 11/1982 | Verbrugge .......................... 526/272 |
| 4,414,355 | 11/1983 | Pokorny ............................. 525/207 |
| 4,415,694 | 11/1983 | Roiko et al. ........................ 525/207 |

OTHER PUBLICATIONS

U.S. Application SN. 06/508697.

Primary Examiner—Joseph L. Schofer
Assistant Examiner—J. M. Reddick

[57] ABSTRACT

A coating composition which produces glossy, clear coatings comprises a terpolymer of an anhydride, a higher alphaolefin and either a lower alphaolefin or a mono-alkenyl aromatic compound; an acrylic emulsion polymer and the balance of the composition being an aqueous vehicle.

6 Claims, No Drawings

COATINGS CONTAINING AN ALPHAOLEFIN TERPOLYMER

BACKGROUND OF THE INVENTION

This invention relates to novel coating compositions and substrates coated therewith. More particularly, this invention relates to novel coating compositions including a terpolymer comprising at least one higher alphaolefin, an anhydride and either a lower alphaolefin or a mono-alkenyl aromatic compound.

Attempts have been made to prepare substrate coatings such as overprint varnishes and inks which have good slip and non-blocking characteristics. By this is meant the coating will not, under the effect of temperature, pressure or a combination of temperature and pressure, soften or otherwise adhere to the surrounding coating, substrates and/or films. In high-speed manufacturing processes of coated materials, the substrate is quickly stacked after coating and if the non-blocking characteristic of the coating is poor, the articles may not properly stack or may adhere to surrounding coatings and substrates thereby ruining a portion of the product.

It has been surprisingly found that a coating composition which comprises from 0.5 to 30 percent by weight of at least one terpolymer of an anhydride, a higher alphaolefin and either a lower alphaolefin or a mono-alkenyl aromatic compound, from 1 to 55 percent by weight of an acrylic emulsion polymer having a weight average molecular weight of greater than 20,000 and the balance aqueous vehicle, will impart excellent coating properties to the substrate such as clarity, gloss, rub resistance, etc. and also form a non-blocking coating with good slip characteristics.

It is therefore the primary object of the present invention to provide an aqueous coating composition having good slip and non-blocking characteristics.

It is a further object of the present invention to provide an aqueous coating composition having good non-blocking properties which can be used as an overprint coating with good gloss.

It is a still further object of the present invention to provide a substrate coated with a composition having good slip and non-blocking characteristics.

It is a still further object of the present invention to provide a composition which imparts good water resistence and dry-rub characteristics to a substrate.

Still further objects and advantages of the composition of the present invention will become more apparent from the following more detailed description thereof.

DETAILED DESCRIPTION OF THE INVENTION

The coating compositions of this invention comprise from about 0.5 to 30 percent of a terpolymer which comprises from 49 to 60 mole percent of an anhydride, from 20 to 40 mole percent of at least one monomer selected from the group consisting of 1-alkene having from 4 to 16 carbon atoms, mono-alkenyl aromatic compounds and mixtures thereof, and from 20 to 40 mole percent of at least one 1-alkene having at least 18 carbon atoms: from about 1 to 55 percent by weight of an emulsion polymer having a weight average molecular weight of greater than 20,000 and the balance being an aqueous vehicle.

As used in the instant specification and claims, the term "aqueous vehicle" includes water and mixtures of water with various water miscible solvents such as 2-butoxyethanol, 2-ethoxyethyl acetate, ethanol, n-propanol, 2-ethoxyethanol, aromatic petroleum distilates such as Solvesso 100 and Solvesso 150 from Exxon Corp., esters such as isopropyl acetate, ketones such as methylethylketone, etc.

The coating compositions of the present invention include from 0.5 to 30 percent by weight of a terpolymer comprising from 49 to 60 mole percent of at least one anhydride, from 20 to 40 percent by weight of at least one monomer selected from the group consisting of 1-alkene having 4 to 16 carbon atoms, mono-alkenyl aromatic compounds and mixtures thereof, and from 20 to 40 mole percent of at least one 1-alkene having at least 18 carbon atoms. Examples of these terpolymers are described in co-pending patent application, filed on the same day as this application entitled AROMATIC MONOVINYL ALKENYL ALPHAOLEFIN ANHYDRIDE TERPOLYMERS in the name of Calvin J. Verbugge, U.S. Pat. No. 4,522,992, and in U.S. Pat. No. 4,358,573, the disclosures of which are hereby incorporated by reference. The aromatic monoalkenyl monomer is preferably styrene, alphamethyl styrene, vinyl toluene and mixtures thereof. The preferred terpolymers for use in the coating compositions of the present invention include those terpolymers wherein the anhydride is maleic anhydride and the second monomer is styrene or a 1-alkene having from 4 to 10 carbon atoms such as 1-butene, 1-pentene, 1-hexene, 1-heptene, 1-octene, 1-noneme and 1-decene. Most preferred terpolymers include polymers where the second monomer is styrene. These most preferred terpolymers add better scratch resistance and better adhesion to the coating. Preferred terpolymers comprise from 49 to 55 percent by weight maleic anhydride, 20 to 30 percent by weight styrene and 20 to 30 percent by weight higher 1-alkene. Examples of suitable terpolymers include terpolymers of maleic anhydride, styrene and 1-eicosene; maleic anhydride, styrene and mixed C20-24 1-alkene; maleic anhydride, styrene and 1-octadecene and the like.

As noted above, the terpolymers are present in the composition in the amount of from 0.5 to 30 percent by weight. These terpolymers are present as alkali dispersions. These dispersions are found using any suitable base such as sodium, potassium or ammonium hydroxide. Ammonium hydroxide is the preferred base as this material is fugitive and can leave the coating after application to make a more water-resistent coating. Typically these dispersions comprise from 10 to 40 percent by weight terpolymer in an aqueous system and have a pH within the range of from 6.5 to 10.0.

The compositions of the present invention should comprise from 0.5 to 30 percent by weight terpolymer. It is preferred the compositions include 2 to 10 percent by weight terpolymer and preferably from 2 to 7.5 percent by weight of terpolymer.

The second component of the coating compositions of the present invention comprises an acrylic emulsion polymer. These emulsion polymers must have a weight average molecular weight as determined by gel permeation chromatography of greater than 20,000. Suitable acrylic emulsion polymers include polymers containing the following monomers: methyl methacrylate, methylacrylate, methylacrylic acid, acrylic acid, itaconic acid, ethyl acrylate, butyl acrylate, ethyl hexyl acrylate, ethyl methacrylate, butyl methacrylate, hydroxy arcylates, hydroxy methacrylates, styrene, alpha-methyl styrene, acrylonitrile, etc. Specific acrylic emulsion polymers include polymers with the following monomer content: copolymers of styrene, ethyl acrylate, 2-ethyl hexyl acrylate and acrylic acid; styrene, butyl methacrylate and methacrylic acid; styrene, methylmethacrylate, ethyl acrylate and methacrylic acid; styrene, methylmethacrylate, ethyl acrylate, butyl acrylate, methacrylic acid and acrylic acid; styrene, methyl methacrylate, butylacrylate and methacrylic acid; styrene, butylmethacrylate and methacrylic acid; styrene, acrylonitrile, 2-ethyl hexyl acrylate and methacrylic acid; methyl methacrylate, 2-ethyl hexyl acrylate and methacrylic acid; etc.

Typically, the above acrylic emulsion polymers contain from 15-75% by weight of at least one hard monomers, i.e. those monomers which produce homopolymers having a Tg of greater than 20° C.; 20-70% by weight of at least one soft monomer, i.e. those monomers which product homopolymers having a Tg of less than 20° C. and 3-25% by weight of an acid monomer, i.e. those monomers having carboxyl functionality.

In addition to the acrylic emulsion polymers, other suitable acrylic emulsion polymers include polymers formed by emulsion polymerization in the presence of a low molecular weight resin. These materials include polymers having monomers as listed above which polymerized using an emulsion polymerization action technique in the presence of a low molecular weight, i.e. number average of less than 7,000, resin. Typical resins contain styrene, alpha methyl styrene, acrylates, methacrylates and carbonyl containing monomers and have an acid number within the range of 100-300.

Examples of these resins include: styrene and acrylic acid; styrene, alpha methyl styrene and acrylic acid; styrene, butylacrylate and acrylic acid; alphamethylstyrene, butylacrylate and acrylic acid; styrene, ethylacrylate and acrylic acid; alphamethylstyrene, ethylacrylate and acrylic acid; styrene, methylmethacrylate and acrylic acid and the like including mixtures. The acrylic emulsion polymers typically contain methylmethacrylate, 2-ethylhexyl acrylate and butylacrylate; styrene and 2-ethylhexyl acrylate; styrene; methylmethacrylate, butyl acrylate and isobutyl methacrylate; and the like.

The preferred acrylic emulsion polymers are those prepared by emulsion polymerization in the presence of a low molecular weight acrylic polymer. These materials, when neutralized, have less sensitivity to high pH's and accordingly retain their viscosity characteristics at the pH's of the composition of the present invention. The preferred emulsion polymers include the following: polymers prepared by emulsion polymerization of at least one of methylmethacrylate, butyl methacrylate, styrene, butyl acrylate and 2-ethylhexyl acrylate in the presence of a low molecular weight polymer having number average molecular weight of less than 5,000 and an acid value of 150 to 270.

The emulsion polymers can be prepared in any of a number of conventional emulsion polymerization processes. Suitable processes for producing the emulsion polymers in the presence of the low molecular weight polymer are disclosed in U.S. Pat. No. 4,062,823.

As noted above, emulsion polymers are to be present in an amount of from 1 to 55 percent by weight. It is preferred that the emulsion polymer of the present in an amount of from 20 to 40 percent by weight and most preferably from 25 to 35 percent by weight.

The compositions of the present invention also include an aqueous vehicle. The aqueous vehicle includes water and mixtures of water with various water miscible solvents such as 2-butoxyethanol, 2-ethoxyethyl acetate, ethanol, n-propanol, isopropanol 2-ethoxyethanol, aromatic petroleum distilates such as Solvesso 100 and Solvesso 150 from Exxon Corp., esters such as isopropyl acetate, ketones such as methylethylketone, etc. and mixtures thereof. The aqueous vehicle forms the balance of the composition. The preferred aqueous vehicles are mixtures of water, 2-ethoxyethyl acetate, 2-butoxyethanol, mixtures of water and 2-ethoxyethanol, mixtures of water and 2-ethoxyethyl acetate, and mixtures of water, 2-butoxyethanol, and aromatic petroleum distilates. As noted above, water is utilized as a carrier in the composition of the present invention, however the amount of water should be kept at a minimum, especially if the substrate to be coated is essentially impermeable such as polyethylene film or aluminum or other metal foils. Certain of the above solvents are more water miscible than others. For those solvents with a low degree of water miscibility the amount used as part of the aqueous vehicle should be such that the solvent will not interfere with the stability of the composition. For papers and other cellulosic substrates the water content may be higher as the water can be absorbed by the substrate allowing faster drying times.

In addition to the above three components, the compositions of the present invention can include from 0 to 25 percent by weight of a slip aid. Suitable slip aids include polyethylene wax emulsions, polytetrafluoroethylene, paraffin wax emulsions, silicone fluids and emulsions and mixtures thereof. These materials are all well known in the coatings industry and are available commercially. Certain slip aid emulsions can be prepared using polyethylene wax and conventional pressure emulsification techniques. Typically, emulsions useful as slip-aids contain from 20 to 50 percent nonvolatiles. These slip-aids are used in the conventional manner in order to improve the slip and handling characteristics of the films.

The compositions of the present invention also can include up to 10 percent by weight of other optional ingredients including pigments, dyes, fragrance, germicides, fillers, defoamers, surfactants, wetting agents and the like. These components are conventionally used in the industry and can be incorporated into the compositions of the present invention in their conventional additive amounts.

The compositions of the present invention are suitable for coating a wide variety of substrates, including various cellulose substrates such as paper, clay-coated paper, kraft paper, bonded kraft paper, poster board, folding cartons, wood and the like, as well as impermeable substrates such as polyethylene films, polypropylene films, aluminum foil and other metal foils, and other porous and non-porous substrates.

The compositions of the present invention can be coated on these substrates using a variety of methods including roll-coating, flexographic coating, gravure coating, knife coating, squeegee coating, curtain coating and rod coating.

The compositions of the present invention can be prepared by mixing the components together. This mixing can be done at room temperature and elevated pressures or special mixing equipment are not required.

The compositions of the present invention will now be illustrated by way of the following examples which are for the purpose of illustration are in no way to be considered as limiting. In the following examples, all parts and percentages are by weight and all temperatures are in °C.

EXAMPLE A

Charge 224 grams of 1-eicosene and 244 grams of ethoxyethanol acetate to a 2000 milliliter reaction flask. Begin stirring and heat the mixture to 140° C. Melt 204.2 grams of maleic anhydride and then transfer it to a heated dropping funnel. Maintain the maleic anhydride in a molten state.

Combine 125 grams of styrene, 15.52 grams of tertiary butyl perbenozoate and 9.90 grams of divinyl benzene (55% active) and then transfer to a second dropping funnel.

Maintain 140° C. and run the reaction under a nitrogen head with continuous stirring, adding the contents of both dropping funnels at an even pace over a one-hour addition period. Upon completion of the addition, maintain 140° C. for a 45 minute hold period. Pour the contents of the flask into a container. Strip off the solvent by use of a wiped film evaporator to form the dry polymer.

An ammonia cut of this polymer was prepared at 25 percent solids by mixing 200 grams of the above polymer with 89.1 grams of 28 percent aqueous ammonia and 510.9 grams of distilled water. This mixture was stirred for one hour at 70° C. The resulting solution was cooled to room temperature and had a viscosity of about 430 centipoise measured at 25° C.

EXAMPLE 1

A non-blocking overprint varnish having the following composition was prepared:

| | |
|---|---|
| Polymer of Example A (25% Solids) | 13.00% |
| Polyethylene Wax Emulsion (25% Solids) (JONWAX 26 available from S. C. Johnson & Son, Inc.) | 5.00 |
| Paraffin-Polyethylene Wax Emulsion (34% Solids) (JONWAX 120 available from S. C. Johnson & Son, Inc.) | 10.00 |
| Emulsion polymer containing styrene, 2-ethylhexyl acrylate alpha methylstyrene and acrylic acid (Joncryl 537 available from S. C. Johnson & Son, Inc.) (46% Solids) | 63.00 |
| 2-butoxyethanol | 6.30 |
| Solvesso 150 (Petroleum Naphtha - Exxon Corp) | 0.70 |
| HV-490 (50% Silicone Emulsion - Dow Corning) | 2.00 |

The above formulation was coated on card stock at a coating weight of about 0.5 pounds per 1,000 square feet dry coating weight. This coating was clear and had a good gloss with good slip properties. This coated stock was subjected to a blocking test and did not block when stacked coating face to coating face and coating face to noncoated stock at 20 psi at 150° F. for 24 hours. A second blocking test at 250° F. under 30 psi for 2 seconds also did not cause blocking. It also demonstrated high slip (low static slide angle) when tested coated surface to coated surface. The slide angle was determined by placing a sample of the coated card stock on a 500 gram block and a second sample of coated card stock on the bed of a Cenco Incline Plane. The block is placed on the plane and the plane is gradually elevated; the angle at which the block begins to slide is the static slide angle. Readings of 9° to 12° are achieved with this coating as compared to 15° to 18° for acrylic systems without the polymer of Example A.

EXAMPLE 2

A further overprint formulation with the following formulation was prepared:

| | |
|---|---|
| Polymer of Example A (25% Solids) | 15.00% |
| Emulsion polymer containing styrene, acrylonitile, 2-ethylhexylacrylate and methacrylic acid (RHOPLEX WL-91 from Rohm & Haas) (50% Solids) | 62.00 |
| 2-butoxyethanol | 6.00 |
| HV-490 Silicone Emulsion (50% Solids) | 2.00 |
| Polyethyene wax emulsion (25% Solids) (JONWAX 26) | 5.00 |
| Paraffin polyethylene wax emulsion (34% Solids) (JONWAX 120) | 10.00 |

This formulation when coated on card stock had better solvent resistance than the formulation of Example 1. Other properties were similar.

EXAMPLE 3

A formulation which is useful as an ink is prepared having the following formulation:

| | |
|---|---|
| Polymer of Example A (25% Solids) | 10.00% |
| Emulsion polymer* (40% Solids) | 58.77 |
| Urea | 11.25 |
| 67% Styrene/33% Acylic Acid resin (Mw 4,000) (27% Solids) | 19.98 |

*10% Methacrylic acid, 5% acrylic acid, 22% methymethacrylate, 4% Styrene, 57% Ethyl acrylate and 2% butyl acrylate.

This formulation when used as an ink had good scuff and rub resistance and had similar blocking properties as the formula of Example 1.

EXAMPLE 4

Example 1 was repeated except the emulsion polymer was replaced by the following commercially available emulsion polymers.
(a) Acrysol I53 from Rohm & Haas;
(b) 22-1271 from Zimchem; and
(c) 1052 from Polyvinyl Chemicals The above formulations were coated on card stock and evaluated as in Example 1. The I53 polymer had fair slip and non-blocking properties but had lower gloss than Example 1. The 22-1271 polymer had good slip and non-blocking properties but had only fair gloss. The 1052 polymer had good slip, non-blocking and gloss properties.

What I claim is:
1. A coating composition comprising:
(a) from 0.5 to 30% by weight of a terpolymer which comprises:
  (i) from about 49 to 60 mole percent of maleic anhydride;
  (ii) from about 20 to 40 mole percent of at least one monomer selected from the group consisting of a 1-alkene having from 4 to 16 carbon atoms, a monoalkenyl aromatic compound selected from styrene, alphamethyl styrene, vinyl toluene and mixtures thereof; and
  (iii) from about 20 to 40 mole percent of at least one 1-alkene having at least 18 carbon atoms;
(b) from about 1 to 55 percent by weight of an acrylic emulsion polymer having a weight average molecular weight of greater than 20,000; and
(c) the balance being an aqueous vehicle.

2. The composition of claim 1 wherein the terpolymer comprises:
   (i) from about 49 to 60 mole percent of maleic anhydride;
   (ii) from about 20 to 40 mole percent styrene; and
   (iii) from about 20 to 40 mole percent of at least one 1-alkene having at least 18 carbon atoms.

3. The composition of claim 1 wherein the terpolymer is present in an amount from 2 to 10 percent, the emulsion polymer is present in an amount of from to 20 to 40 percent and the balance being an aqueous vehicle.

4. The composition of claim 4 wherein the terpolymer is present in an amount from 2 to 10 percent, the emulsion polymer is present in an amount of from to 20 to 40 percent and the balance being an aqueous vehicle.

5. The composition of claim 1 wherein the composition includes from about 0 to 25% by weight of said composition of a slip aid.

6. The composition of claim 1 wherein the terpolymer is present in an amount of from 2 to 7.5 percent by weight and the emulsion polymer is present in an amount of from 25 to 35 percent by weight and the balance being an aqueous vehicle.

* * * * *